(12) United States Patent
James et al.

(10) Patent No.: US 7,832,445 B2
(45) Date of Patent: Nov. 16, 2010

(54) LAMINATOR ASSEMBLY

(75) Inventors: Michael James, Twyford (GB); Sam Bradley, Huntingdon (GB)

(73) Assignee: ACCO UK Limited, Aylesbury (GB)

( * ) Notice: Subject to any disclaimer, the term of this patent is extended or adjusted under 35 U.S.C. 154(b) by 262 days.

(21) Appl. No.: 11/875,081

(22) Filed: Oct. 19, 2007

(65) Prior Publication Data

US 2008/0093028 A1 Apr. 24, 2008

(30) Foreign Application Priority Data

Oct. 24, 2006 (GB) .................................. 0621168.4

(51) Int. Cl.
*B32B 37/00* (2006.01)
(52) U.S. Cl. .................. 156/499; 156/555; 156/582; 156/583.1
(58) Field of Classification Search .............. 156/499, 156/555, 580, 582, 583.1
See application file for complete search history.

(56) References Cited

U.S. PATENT DOCUMENTS

| | | | |
|---|---|---|---|
| 6,244,319 B1 * | 6/2001 | Maynard et al. | 156/354 |
| 6,283,188 B1 * | 9/2001 | Maynard et al. | 156/521 |
| 2004/0040669 A1 * | 3/2004 | Lin | 156/555 |

FOREIGN PATENT DOCUMENTS

| | | |
|---|---|---|
| EP | 1470913 | 10/2004 |
| JP | 59 093319 | 5/1984 |
| JP | 04 054831 | 5/1992 |
| JP | 2005164895 | 6/2005 |
| WO | 82/03356 | 10/1982 |
| WO | 0013898 | 3/2000 |
| WO | 03097331 | 11/2003 |

OTHER PUBLICATIONS

European Search Report for application No. EP 07019741, dated Apr. 17, 2008, 4 pages.

* cited by examiner

*Primary Examiner*—James Sells
(74) *Attorney, Agent, or Firm*—Michael Best & Friedrich LLP

(57) ABSTRACT

A laminator assembly comprising a pair of rollers, the rollers defining a compression zone therebetween for compressing a substantially flat lamination pouch as the pouch is fed between the rollers and advanced through the compression zone for exit on the exit side of the rollers, a heat source being provided for heating the lamination pouch as the lamination pouch is compressed between the rollers, the laminator assembly further comprising two sets of blade members positioned on the exit side of the rollers and spaced from the compression-plane of the rollers, each set of blade members being arranged axially along a respective roller and in close proximity to the exterior surface of the respective roller for preventing the lamination pouch from passing between the roller and respective blade members.

24 Claims, 4 Drawing Sheets

000# LAMINATOR ASSEMBLY

The present invention relates to a laminator assembly for use in a laminator.

Laminators are well known and, generally speaking, are used to bond an outer layer of laminating material to a substantially flat sheet of material to form a laminate.

The laminating material, which has an adhesive backing, is typically provided in the form of a pouch or envelope into which the sheet material may be placed prior to insertion into a laminator; alternatively the laminating material may simply be provided in the form of a sheet or film which is laid over the sheet material to form a multi-layer sandwich prior to insertion into the laminator.

In a typical "two-roller" laminator, the laminating pouch or sandwich is fed between a pair of rollers which act to compress the lamination pouch or sandwich, thereby bonding the laminating material sheet to the flat sheet of material. During normal operation, the resulting laminate exits from between the rollers and is guided away from the rollers between a pair of exit plates associated with the rollers.

In the common case of "hot lamination", the laminating material may generally be provided with a heat-curable adhesive resin backing, and the laminator further comprises a heat source, typically located in the region of the rollers, for melting the adhesive as the laminating pouch or sandwich is compressed between the "hot rollers", the adhesive hardening as it cools to fixedly bond the laminating material to the sheet of material.

A typical "four-roller" laminator is similar to a "two-roller" laminator but, in addition to a first pair of rollers, the laminator further comprises a second pair of rollers positioned "downstream" of the first pair of rollers. In this manner, the laminating pouch or sandwich is fed between both pairs of rollers and is therefore subject to a two-stage compression process.

Each pair of rollers in a "four-roller" laminator can conveniently be thought of as corresponding to a "two-roller" assembly similar to that found in a "two-roller" laminator. Thus, each of the two pairs of rollers has an associated pair of exit plates for guiding the laminating pouch away from the respective rollers.

Where the "four-roller" laminator is used for "hot lamination", the laminating material may again be provided with a heat curable adhesive resin backing, and the laminator further comprises one or more heat sources, typically located in the region of one or more of the pairs of rollers, for melting the adhesive as the laminating pouch or sandwich is compressed between the respective rollers.

One problem associated with conventional laminators is that of jamming.

Broadly speaking, there are essentially two types of jam which commonly occur in conventional laminators, and these may be distinguished from one another as "roller jams" and "exit plate jams".

"Roller jams" occur when the laminating pouch or sandwich becomes adhered to one of the rollers, for example due to excessive residual adhesive on the roller from prior use, or due to adhesive in the pouch or sandwich being squeezed onto the rollers during operation of the laminator. Rather than exiting from between the rollers, the laminating pouch or sandwich remains stuck to the outer surface of the respective roller, where it may cause a blockage within the laminator or otherwise interfere with the operation of the laminator.

"Exit plate jams" may occur in laminators during hot lamination. In an "exit plate jam" the laminating pouch or sandwich properly exits from between the rollers as the final laminate, but, due to the high temperatures in the proximity of the rollers and exit plates, curling or wrinkling of the laminate occurs after it has exited from between the rollers. If a sufficient degree of curling or wrinkling occurs, the laminate may again cause a blockage, particularly in the region of the exit plates, with any slight contact of the laminate with the exit plates greatly accentuating the curling effect and exacerbating the problem.

Jams within laminators can be difficult to rectify, due in part to the fact that, even if the laminating pouch or sandwich can be easily removed from within the laminator, residual adhesive may nevertheless still be difficult to remove from various components within the laminator. Indeed, once a jam has occurred within a laminator, it is often that case that the laminator must be stripped down and reconditioned to restore operating efficiency.

It is an object of the present invention to seek to provide an improved laminator assembly. More particularly, it is an object of the present invention to seek to provide a laminator assembly which may alleviate the problem of jamming in laminators.

According to the present invention there is provided a laminator assembly comprising a pair of rollers, the rollers defining a compression zone therebetween for compressing a substantially flat lamination pouch as the pouch is fed between the rollers and advanced through the compression zone for exit on the exit side of the rollers, a heat source being provided for heating the lamination pouch as the lamination pouch is compressed between the rollers, the laminator assembly further comprising two sets of blade members positioned on the exit side of the rollers and spaced from the compression-plane of the rollers, each set of blade members being arranged axially along a respective roller and in close proximity to the exterior surface of the respective roller for preventing the lamination pouch from passing between the roller and respective blade members.

Conveniently, the exterior surface of one or both rollers incorporates a series of circumferential slits corresponding to the respective set of blade members, each one of said blade members extending into a respective slit in the roller.

Preferably, the width of one or more of the circumferential slits is 0.1 to 0.45 mm.

Preferably, the depth of one or more of the circumferential slits is 1 mm to 4 mm.

Conveniently, one or both of the rollers has four of said circumferential slits and the respective set of blade members comprises four blade members.

Conveniently, one or both of the rollers has five of said circumferential slits and the respective set of blade members comprises five blade members.

Preferably, the bottom roller has five of said circumferential slits and the top roller has four of said circumferential slits.

Conveniently, the slits are spaced apart from one another along the longitudinal axis of the respective roller, symmetrically about the mid-point of the respective longitudinal axis.

In a preferred embodiment, each of the rollers comprises an inner pair of circumferential slits spaced symmetrically either side of the mid point of the respective roller, and an outer pair of circumferential slits spaced symmetrically either side of the inner pair of slits, the roller with five circumferential slits further comprising a slit positioned at the mid point of the roller.

Conveniently, the outer pair of slits on each roller having four circumferential slits are positioned for allowing one of either an A4-sized laminating pouch or A3-sized laminating pouch to be initially aligned with the rollers such that the outer pair of slits are spaced inwardly from the outer edge of the laminating pouch a distance 9 mm to 11 mm, preferably 10 mm.

Preferably, the outer pair of slits on each roller having five circumferential slits are positioned for allowing one of either an A4-sized laminating pouch or A3-sized laminating pouch to be initially aligned with the rollers such that the outer pair of slits are spaced inwardly from the outer edges of the laminating pouch a distance 14 mm to 16 mm, preferably 15 mm.

In a preferred embodiment, each roller incorporating four circumferential slits is 245 mm to 250 mm long, with the inner pair of slits being spaced either side of said mid point at a distance 30 mm to 40 mm from said mid point, and the outer pair of slits being spaced either side of said mid point at a distance 90 mm to 100 mm from said mid point.

Conveniently, the roller is between 247 mm and 248 mm long, the inner pair of circumferential slits being spaced either side of the mid point at a distance 31 mm to 33 mm from the mid point, and the outer pair of circumferential slits being spaced either side of said mid point at a distance 94 mm to 96 mm from said mid point.

Conveniently, each roller incorporating five circumferential slits is 235 mm to 250 mm long, with the inner pair of circumferential slits being spaced either side of the mid point at a distance 40 mm to 50 mm from the mid point, and the outer pair of circumferential slits being spaced either side of the mid point at a distance 85 mm to 95 mm from the mid point.

Preferably, the roller comprising five circumferential slits is between 247 mm and 248 mm long, the inner pair of circumferential slits being spaced either side of the mid point at a distance 44 mm to 46 mm from the mid point, and the outer pair of circumferential slits being spaced either side of said of mid point at a distance 89 mm to 91 mm from the mid point.

In a yet further alternative embodiment, each roller incorporating four circumferential slits is between 330 mm and 335 mm long, preferably 333.5 mm long, with the inner pair of slits being spaced either side of the mid point at a distance 55 mm to 65 mm from the mid point, preferably 60 mm from the mid point, and the outer pair of slits being spaced either side of the mid point a distance 135 mm to 145 mm from the mid point, preferably 138.5 mm from the mid point.

Preferably, each roller incorporating five circumferential slits is between 330 mm and 335 mm long, preferably 333.5 mm long, with the inner pair of slits being spaced either side of the mid point at a distance 60 mm to 70 mm from the mid point, preferably 65 mm from the mid point, and the outer pair of slits being spaced either side of the mid point a distance 130 mm to 140 mm from the mid point, preferably 135 mm from the mid point.

Conveniently, each set of blade members are vertically offset from the feed-plane by a distance in the range 1.8 mm to 1.3 mm, measured parallel to the compression plane.

Optionally, one or both sets of blade members is mounted to an element fixed with respect to the axis of rotation of the respective roller.

Preferably, the laminator assembly incorporates a roller support assembly supporting each roller for rotation with respect to the assembly, one or both sets of blade members being fixedly mounted to the roller support assembly.

Preferably, the roller support assembly includes a heating shoe surrounding one or both rollers, one or both sets of blade members being fixedly attached to the respective heating shoe.

Optionally, the individual blade members are separate from one another.

Preferably, the laminator assembly comprises a pair of exit guide plates on the exit side of the rollers, the guide plates incorporating one or more venting apertures.

According to another aspect of the present invention, there is provided a laminator assembly comprising a pair of rollers for compressing a substantially flat lamination pouch as the pouch is fed between the rollers for removal on an exit side of the rollers, a heat source being provided for heating the lamination pouch as the lamination pouch is compressed between the rollers, the laminator assembly further comprising a pair of exit guide plates on the exit side of the rollers, the guide plates incorporating one or more venting apertures.

Preferably, the guide plates are in the form of grid assemblies.

Optionally, the guide plates are fixedly mounted to the roller assembly.

Preferably, the guide plates are formed from high temperature plastic.

Preferably, the blade members are positioned outside the compression zone.

So that the invention may be readily understood, embodiments of the invention will now be described, by way of example, with reference to the accompanying drawings, in which.

For clarity, FIGS. 1 to 6 illustrate only the principal components of a laminator assembly, these being the components necessary for understanding the present invention; however, it is to be appreciated that, in practice, the laminator assembly will form part of a laminator incorporating additional, conventional components such as, for example, drive mechanisms, control electronics and external and internal housings where appropriate. Detailed discussion of these conventional components is not required for an understanding of the present invention and, except where otherwise specifically mentioned in the following description, it is to be assumed that these components may be utilised in conventional manner in conjunction with the laminator assembly according to the present invention.

Figure 1:
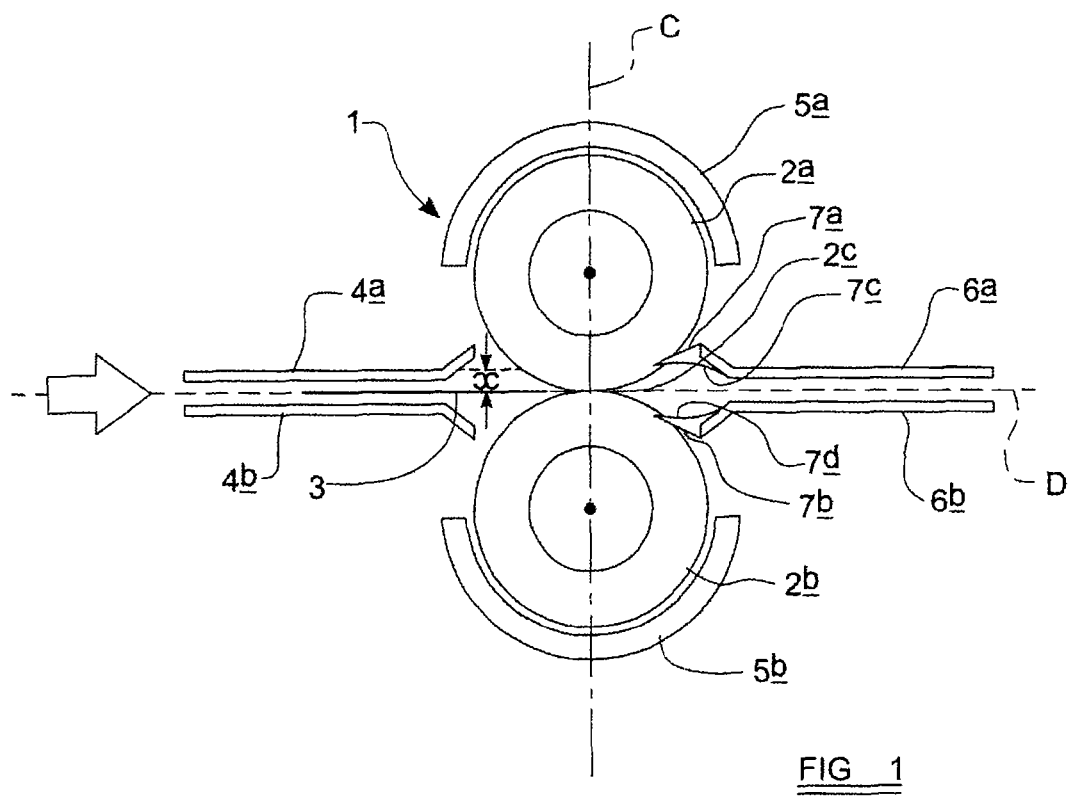
FIG. 1 shows a schematic cross-sectional view of a first embodiment of a laminator assembly according to the present invention.

FIG. 1 shows the principal components of a laminator assembly according to a first embodiment of the present invention.

Laminator assembly 1 comprises a generally cylindrical, rotatable upper roller 2a and a generally cylindrical, rotatable lower roller 2b arranged directly beneath and generally parallel with the upper roller 2a to define a small gap 2c between the rollers, the rollers 2a,2b thus being arranged for compressing a laminating pouch 3 as it is fed between the rollers 2a,2b via a pair of entry guide plates 4a, 4b. In practice, the rollers may be driven using a conventional motor (not shown) in conventional manner, and the laminator may be provided with any suitable conventional feed mechanisms for feeding the laminating pouch 3 through the rollers 2a, 2b as appropriate.

The rollers 2a, 2b can together be considered to define a "compression-plane" C, being the plane including the axes of rotation A, B of the rollers 2a, 2b (extending out of the page in FIG. 1). The rollers 2a,2b in turn also define a "feed-plane" D, being the plane orthogonal to the compression plane C and extending through the gap 2c, equidistant from each of the rollers 2a, 2b.

It will be appreciated that the laminating pouch 3 is advanced through the rollers generally parallel to the feed-plane D, whilst compression of the laminating pouch by the rollers 2a, 2b occurs substantially parallel to the compression-plane C within a compression zone between the rollers.

Still referring to FIG. 1, the laminating assembly 1 is provided with a heat source in the form of a pair of heating shoes 5a, 5b surrounding the respective rollers 2a, 2b. In this manner, the rollers 2a, 2b are heated and, on contact with the lamination pouch 3, act to melt the adhesive within the laminating pouch 3.

A pair of exit guide plates 6a, 6b are located on the exit side of the rollers (the side to the right of the compression plane C in FIG. 1) for guiding the resulting laminate (not shown) away from the rollers 2a,2b, where it may subsequently be removed from the laminating assembly 1.

Figure 2:
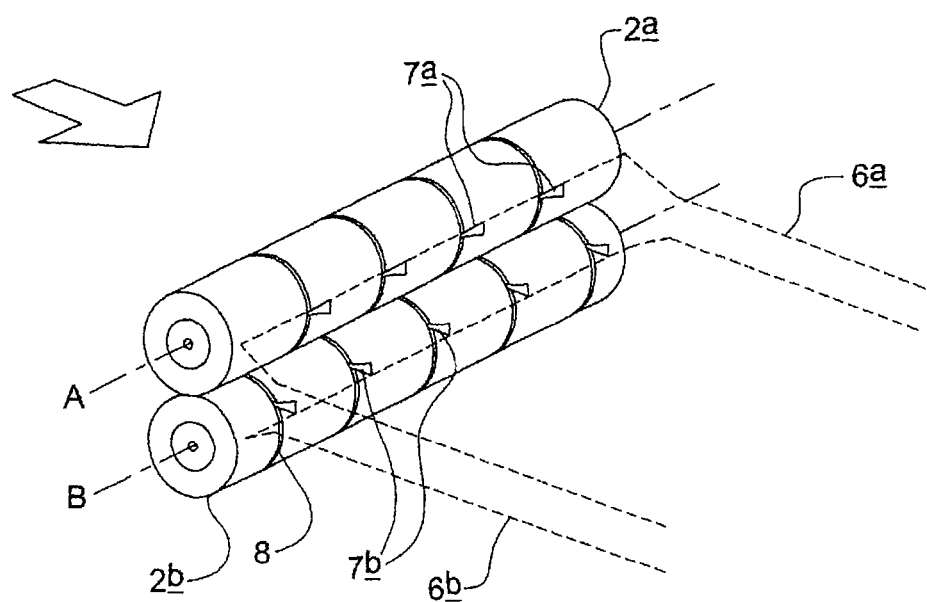
FIG. 2 shows a schematic perspective view of the laminator assembly in FIG. 1.

As best shown in FIG. 2, each of the exit guide plates 6a, 6b are provided with a respective set of blade members 7a, 7b incorporating concave cleaving surfaces 7c, 7d. The set of blade members 7a incorporates four blade members, whilst the set of blade members 7b incorporates five blade members.

Each set of blade members 7a, 7b is positioned on the exit side of the rollers and spaced from the compression-plane of the rollers 2a, 2b. The blade members 7a, 7b are arranged axially along the respective roller 6a, 6b and are arranged such that they extend into corresponding circumferential slits 8 provided on the external surface of the rollers 2a, 2b. Thus, as shown in FIG. 1, the blade members are arranged in close proximity to the exterior surface of the rollers 2a, 2b, and more specifically actually extend into the rollers 2a, 2b.

The close proximity of the sets of blade members 7a, 7b to the rollers 2a, 2b prevents the laminating pouch 3 from passing between the blade members 7a, 7b. In this manner, it will be appreciated that if the laminating pouch 3 becomes adhered to one of the rollers 2a, 2b, the laminating pouch 3 is prevented from being transported away from the exit plates 6a, 6b by the respective roller. Specifically, as the laminating pouch 3 is carried by the roller 2a or 2b, it will initially contact the concave cleaving surface 7c,7d of the blade members 7a or 7b (depending upon which roller 2a, 2b the laminating pouch 3 is adhered to) and the cleaving surface of the blade members will act to cleave the laminating pouch 3 from the respective roller 2a, 2b, thus reducing the risk of a "roller jam" occurring when the laminator assembly 1 is 'in-situ' within a laminator.

Figure 3:
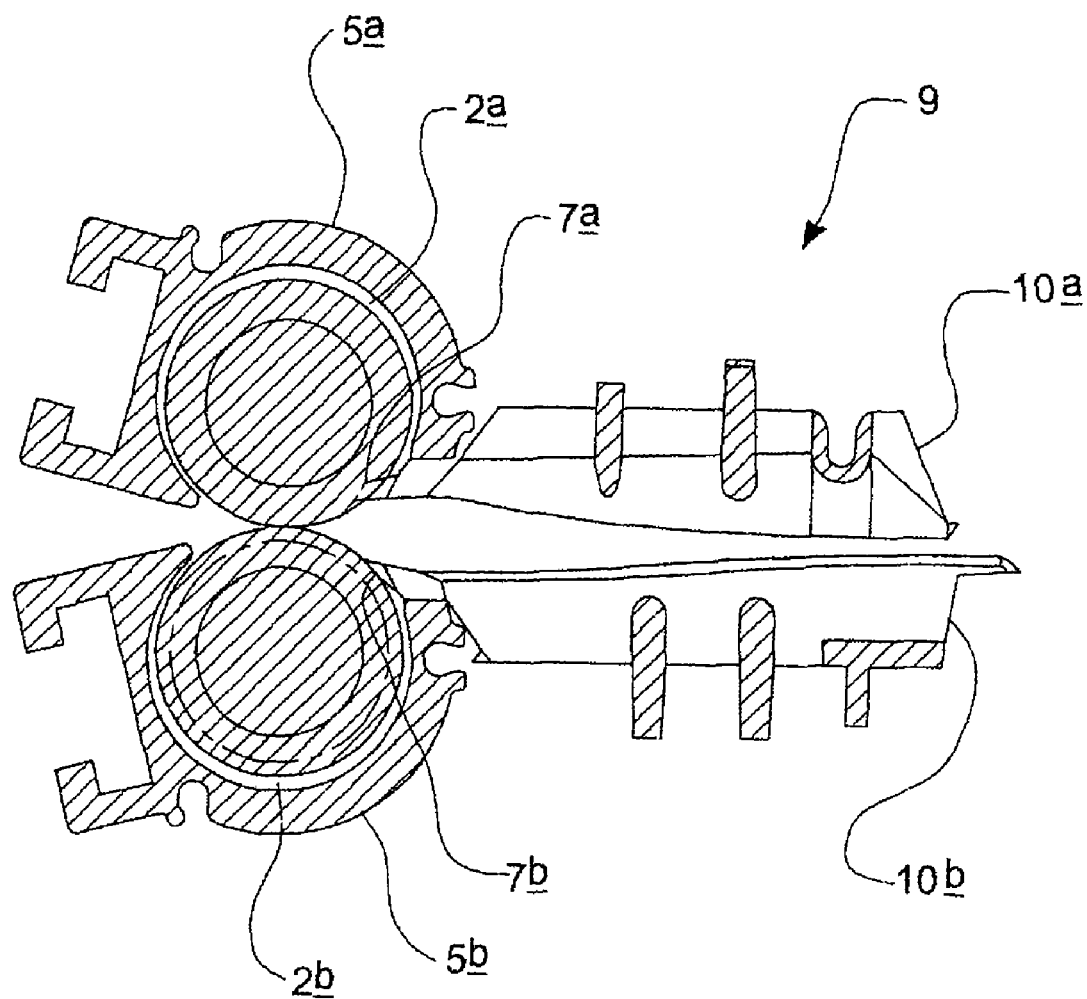
FIG. 3 shows a schematic cross-sectional view of a second embodiment of a laminator assembly according to the present invention.

Turning now to FIG. 3, an alternative embodiment of a laminator assembly is shown.

The laminator assembly 9 shown in FIG. 3 corresponds in many respects to the laminator assembly 1 shown in FIG. 1 and, where appropriate, like features have been accorded like reference numerals for conciseness.

Figure 4:
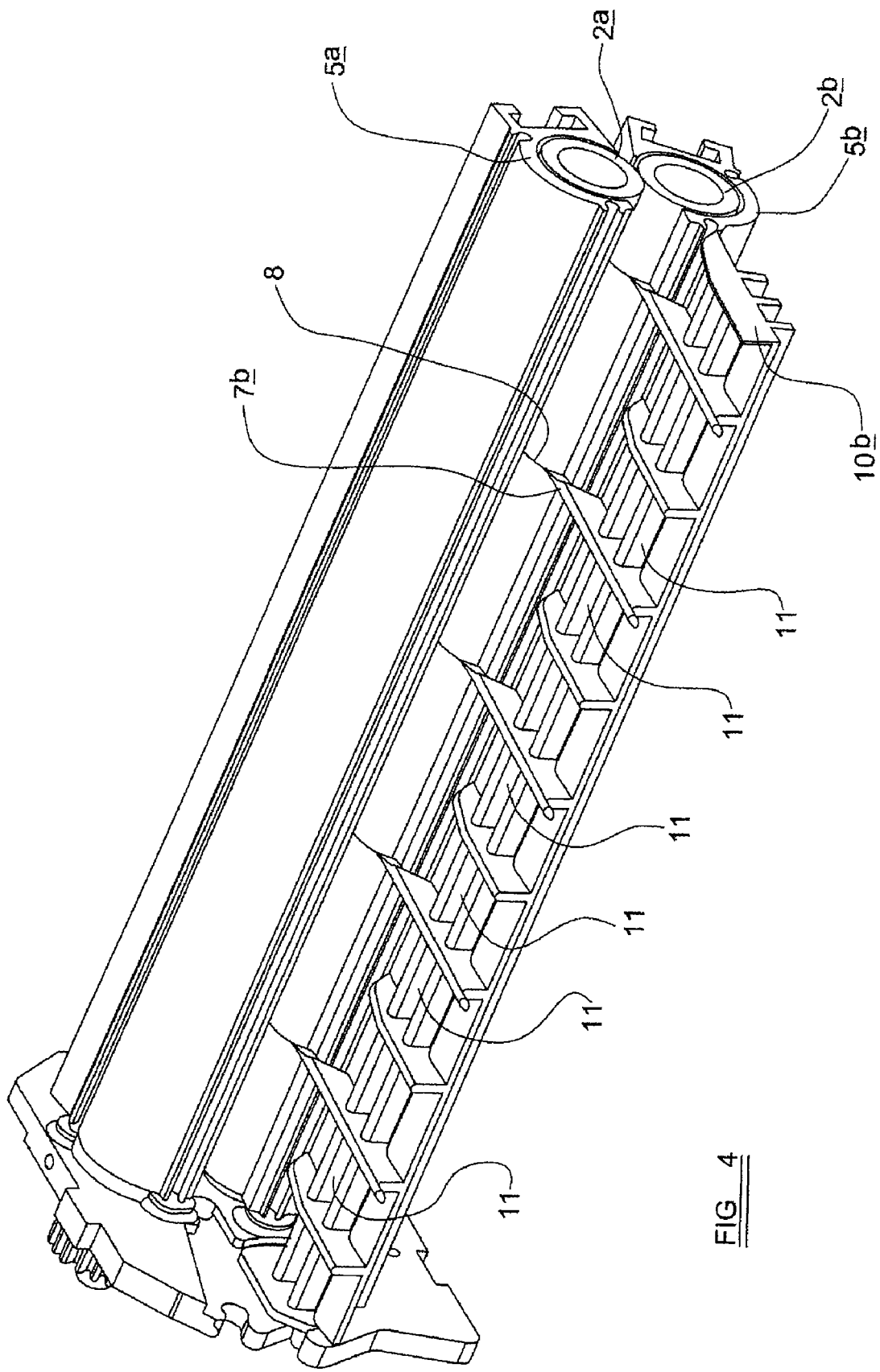
FIG. 4 shows a perspective view illustrating part of the laminator assembly of FIG. 3 in more detail.

Referring then to FIG. 3, laminator assembly 9 differs from laminator assembly 1 only in the configuration of the exit guide plates. Thus, laminator assembly 9 is provided with exit guide plates 10a, 10b having the form of a grid assembly, as best shown in FIG. 4, (which illustrates only the bottom exit plate 10b for clarity) defining a series of venting apertures 11.

The venting apertures 11 serve to dissipate heat from the region between the exit guide plates 10a, 10b as well as in the region immediately adjacent the rollers 2a, 2b; in this manner, curling and/or wrinkling of the resulting laminate is reduced, thereby alleviating the problem of "exit plate jams".

The exit plates may be formed using suitable high-temperature plastic having particularly good insulating properties in order to reduce the effects of residual heating of the exit plates, which might otherwise increase the chance of curling and/or wrinkling of the laminate.

It has been found that in those embodiments where the laminator assembly incorporates rollers having circumferential slits for receiving the blade members, the dimensions and relative position of the slits are surprisingly critical in reducing streaking on the laminate due, for example, to inadequate melting or compression of the adhesive.

Thus, it is preferred that each of the rollers comprises an inner pair of circumferential slits spaced symmetrically either side of the mid point of the rollers, and an outer pair of circumferential slits spaced symmetrically either side of the inner pair of slits (that is, spaced further from the mid point than the inner pair of slits, symmetrical about the mid point), with any roller incorporating five circumferential slits further comprising a slit positioned at the mid point of the roller.

More specifically, it has been found that, for any roller incorporating four circumferential slits, it is preferable that the outer pair of circumferential slits are positioned for allowing one of either an A4-sized laminating pouch or an A3-sized laminating pouch to be initially aligned with the rollers such that the outer pair of slits are spaced inwardly (i.e. towards the mid point of the roller) from the outer edge of the laminating pouch a distance 9 mm to 11 mm, and preferably 10 mm.

Similarly, it has been found that for each roller having five circumferential slits, it is preferable that the outer pair of slits be positioned for allowing one of either an A4-sized laminating pouch or an A3-sized laminating pouch to be initially aligned with the rollers such that the outer pair of slits are spaced inwardly from the outer edges of the laminating pouch a distance 14 mm to 16 mm, preferably 15 mm.

Even more specifically, it has been found that for any roller incorporating four circumferential slits, it is preferable that the roller is 245 mm to 250 mm long, preferably 247 mm to 248 mm long, with the inner pair of slits being spaced either side of the mid point of the roller at a distance 30 mm to 40 mm from the mid point, preferably 31 mm to 33 mm from the mid point, and the outer pair of slits being spaced either side of the mid point at a distance 90 mm to 100 mm from the mid point, preferably 94 mm to 96 mm from the mid point.

Similarly, it has been found that each roller incorporating five circumferential slits should preferably be 245 mm to 250 mm long, more preferably 247 mm to 248 mm long, with the inner pair of circumferential slits being spaced either side of the mid point of the roller at a distance 40 mm to 50 mm from the mid point of the roller, preferably 44 mm to 46 mm, and the outer pair of circumferential slits being spaced either side of the mid point at a distance 85 mm to 95 mm from the mid point of the roller, preferably 89 mm to 91 mm from the mid point.

Alternatively, it has been found that, for each roller incorporating four circumferential slits, it would also be preferable if the roller were between 330 mm and 335 mm long, preferably 333.5 mm long, with the inner pair of slits being spaced either side of the mid point of the roller at a distance 55 mm to 65 mm from the mid point of the roller, preferably 60 mm from the mid point, and the outer pair of slits being spaced either side of the mid point a distance 135 mm to 145 mm from the mid point of the roller, preferably 138.5 mm from the mid point.

Similarly, it has also been found that, alternatively, each roller incorporating five slits may preferably be between 330 mm and 335 mm long, more preferably 333.5 mm long, with the inner pair of slits being spaced either side of the mid point at a distance 60 mm to 70 mm from the mid point, preferably 65 mm from the mid point, and the outer pair of slits being spaced either side of the mid point a distance 130 mm to 140 mm from the mid point, preferably 135 mm from the mid point.

As regards the dimensions of the circumferential slits, it has been found that the width of the slits should preferably be in the range 0.1 mm to 0.45 mm, whilst the depth of each slit should preferably be 1 mm to 4 mm.

Figure 5:
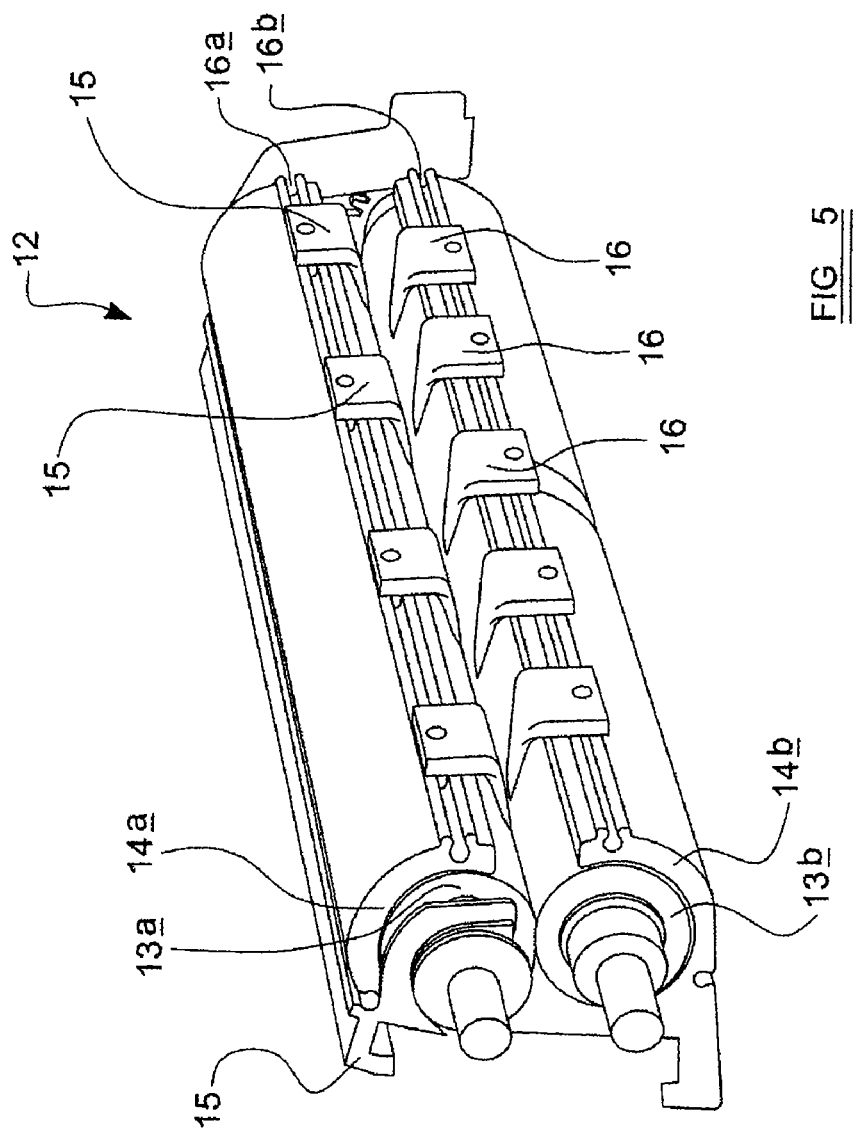
FIG. 5 shows a perspective view of a third embodiment of a laminator assembly according to the present invention.

Turning to FIG. 5, a yet further embodiment of a laminator assembly is shown.

In similar manner to the laminator assemblies 1 and 9, the laminator assembly 12 shown in FIG. 5 comprises a pair of rollers 13a, 13b which are arranged for compressing a laminating pouch 3 as it is fed through the rollers 13a, 13b. In addition, each of the rollers 13a, 13b is provided with a respective heating shoe 14a, 14b for heating the rollers 13a, 13b in similar manner to the rollers 2a, 2b of the previously described embodiments.

Here it is to be noted that, in the embodiment shown in FIG. 5, the heating shoes 14a, 14b form part of a larger roller support assembly 15 (shown only schematically in FIG. 5), being an assembly which supports the rollers 13a, 13b for rotation and which is therefore fixed with respect to the axes of rotation A,B of the rollers 13a, 13b.

The lower end of each heating shoe 14a (on the exit side of the rollers 13a, 13b) is provided with a lateral locating channel 16a, whilst the upper edge of the heating shoe 14b is similarly provided with a lateral locating channel 16b.

Still referring to FIG. 5, the roller 13a is provided with an associated set of four individual blade members 15 fixedly attached along the lower edge of the heating shoe 14a, whilst the roller 13b is provided with an associated set of five individual blade members 16 fixedly attached along the upper edge of the heating shoe 14b.

Figure 6:
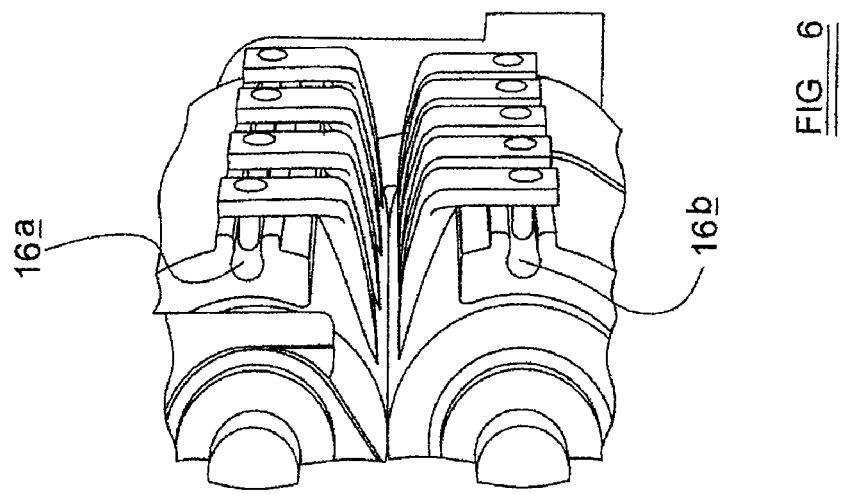
FIG. 6 shows an enlarged perspective view of part of the laminator assembly illustrated in FIG. 5.

As best shown in FIG. 6, each of the blade members 15 is essentially identical and extends downwardly from the lower edge of the respective heating shoe 14a before angling in towards the respective roller 13a, 13b and terminating in a tapered end section in close proximity to the exterior surface of the roller 13a. Similarly, each of the blade members 16 extend upwardly from the upper edge of the heating shoe 14b before angling in towards the roller 14b and terminating in a tapered end section in close proximity to the exterior surface of the roller 13b. The blade members 15, 16 each incorporate a pair of locating lugs 17 which engage the respective locating channel 16a, 16b to locate the blade members in position; the blade members are then screw-fixedly attached to the heating shoes 14a, 14b by means of screws (not shown) which extend through clearance holes 15a, 16a in the blade members 15, 16 and into threaded holes in the heating shoes 14a, 14b.

For the sake of completeness, it is noted that, in contrast to the rollers 2a, 2b of previous embodiments, the rollers 13a, 13b do not incorporate any circumferential slits on their exterior surface, so that the blade members 15, 16 do not extend into the rollers. However, the close proximity of the blade members 15, 16 to the respective rollers 13a, 13b nevertheless prevents passage of the laminating pouch 3 between the exterior surface of the rollers 13a, 13b and the blade members 15, 16, thus alleviating the problem of "roller jams".

It should also be noted that the blade members 15, 16 are securely fixed to the heating shoes 14a, 14b and hence are fixed with respect to the axes of rotation of the rollers 13a, 13b. In this manner, the relative position of the blades and rollers can be maintained within a relatively small tolerance.

Whilst not believed to be essential to alleviating the problem of "roller jams", it has nevertheless been found that it may be particularly advantageous to precisely control the position of the blade members in relation to the rollers in order to optimise the performance of the laminator assembly in preventing "roller jams". Specifically, it has been found that the precise offset of the blade members from the feed-plane D, along the compression plane C (labelled x in FIG. 1 by way of illustration) is surprisingly critical in optimising the performance of the laminator assembly.

Thus, it is preferred that the amount of such offset be 1.8 to 3 mm, and preferably 2.5 mm.

Here, it is to be noted that, as the blade members are spaced from the compression axis C of the rollers, i.e. they do not span the compression axis C, the above-mentioned offset of the blade members with respect to the feed plane can be conveniently altered without having to alter the circumferential slit dimensions or, where the rollers do not incorporate slits, without having to form any slit on the exterior surface of the roller to accommodate the change. This is particularly advantageous where the dimensions of any circumferential slits are themselves critical in reducing streaking on the laminate.

Whilst in the embodiment shown in FIG. 5, the blade members 15, 16 are rigidly fixed to the heating shoes 14a, 14b by means of screws, it is to be appreciated that any suitable means of securely fixing the blade members 15, 16 to the heating shoes 14a, 14b might be used.

Although not illustrated in FIG. 5, the laminator assembly 12 may be provided with exit guide plates, preferably in the form of grid assemblies similar to exit guide plates 10a, 10b, for dissipating heat on the exit side of the rollers to alleviate the problem of "exit plate jams".

For the avoidance of doubt, it is noted that the blade members 15, 16 may be arranged in close proximity to the rollers such that they actually contact the respective rollers 13a, 13b.

Moreover, it is to be appreciated that the use of exit guide plates incorporating venting apertures will allow dissipation of heat from the exit side of the rollers even in the absence of any blade members, so that the blade members are not considered essential for alleviating the problem of "exit plate jams" in accordance with the present invention. Similarly, exit guide plates are not considered essential in alleviating the problem of "roller plate" jams in accordance with the present invention.

For the avoidance of doubt, it is noted that the laminator assembly described in the above embodiments may form part of a "two-roller" laminator or, equally, a "four-roller" laminator.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A laminator assembly comprising a pair of rollers, the rollers defining a compression zone therebetween for compressing a substantially flat lamination pouch as the pouch is fed between the rollers and advanced through the compression zone for exit on the exit side of the rollers, a heat source being provided for heating the lamination pouch as the lamination pouch is compressed between the rollers, the laminator assembly further comprising first and second sets of blade members positioned on the exit side of the rollers and spaced from a compression-plane of the rollers, each set of blade members being arranged axially along a respective roller and in close proximity to an exterior surface of the respective roller for preventing the lamination pouch from passing between the roller and respective blade members;

wherein the blade members of the first set of blade members are out of axial alignment with the blade members of the second set of blade members.

2. A laminator assembly according to claim 1, wherein the exterior surface of at least one of the rollers incorporates a series of circumferential slits corresponding to the respective set of blade members, each one of said blade members extending into a respective slit in the roller.

3. A laminator assembly according to claim 2, wherein the width of one or more of the circumferential slits is 0.1 to 0.45 mm.

4. A laminator assembly according to claim 2, wherein the depth of one or more of the circumferential slits is 1 mm to 4 mm.

5. A laminator assembly according to claim 2, wherein at least one of the rollers has four of said circumferential slits and the respective set of blade members comprises four blade members.

6. A laminator assembly according to claim 2, wherein at least one of the rollers has five of said circumferential slits and the respective set of blade members comprises five blade members.

7. A laminator assembly according to claim 2, wherein one roller has four circumferential slits and the other roller has five circumferential slits.

8. A laminator assembly according to claim 7, wherein each of the rollers comprises an inner pair of circumferential slits spaced symmetrically either side of the midpoint of the rollers, and an outer pair of circumferential slits spaced symmetrically either side of the inner pair of slits, the roller with five circumferential slits further comprising a slit positioned at the midpoint of the roller.

9. A laminator assembly according to claim 8, wherein the outer pair of slits on each roller having four such slits are positioned for allowing one of either an A4-sized laminating pouch or A3-sized laminating pouch to be initially aligned with the rollers such that the outer pair of slits are spaced inwardly from the outer edge of the laminating pouch a distance 9 mm to 11 mm.

10. A laminator assembly according to claim 8, wherein the outer pair of slits on each roller having five such slits are positioned for allowing one of either an A4-sized laminating pouch or A3-sized laminating pouch to be initially aligned with the rollers such that the outer pair of slits are spaced inwardly from the outer edges of the laminating pouch a distance 14 mm to 16 mm.

11. A laminator assembly according to claim 9, wherein each roller incorporating four circumferential slits is 245 to 250 mm long, with the inner pair of slits being spaced either side of said midpoint at a distance 30 to 40 mm from said midpoint, and the outer pair of slits being spaced either side of said midpoint at a distance 90 to 100 mm from said midpoint.

12. A laminator assembly according to claim 11, wherein the roller is between 247 mm and 248 mm long, the inner pair of circumferential slits being spaced either side of the midpoint at a distance 31 mm to 33 mm from the midpoint, and the outer pair of circumferential slits being spaced either side of said midpoint at a distance 94 mm to 96 mm from said midpoint.

13. A laminator assembly according to claim 9, wherein each roller incorporating five circumferential slits is 245 to 250 mm long, with the inner pair of circumferential slits being spaced either side of the midpoint at a distance 40 mm to 50 mm from the midpoint, and the outer pair of circumferential slits being spaced either side of the midpoint at a distance 85 mm to 95 mm from the midpoint.

14. A laminator assembly according to claim 13, wherein the roller is between 247 and 248 mm long, the inner pair of circumferential slits being spaced either side of the midpoint at a distance 44 mm to 46 mm from the midpoint, and the outer pair of circumferential slits being spaced either side of said midpoint at a distance 89 mm to 91 mm from the midpoint.

15. A laminator assembly according to claim 9, wherein each roller incorporating four slits is between 330 mm and 335 mm long, with the inner pair of slits being spaced either side of the midpoint at a distance 55 mm to 65 mm from the midpoint, and the outer pair of slits being spaced either side of the midpoint a distance 135 mm to 145 mm from the midpoint.

16. A laminator assembly according to claim 9, wherein each roller incorporating five slits is between 330 mm and 335 mm long, with the inner pair of slits being spaced either side of the midpoint at a distance 60 mm to 70 mm from the midpoint, and the outer pair of slits being spaced either side of the midpoint a distance 130 mm to 140 mm from the midpoint.

17. A laminator assembly according to claim 7, wherein the bottom roller has five of said circumferential slits and the top roller has four of said circumferential slits.

18. A laminator assembly according to claim 1, wherein each set of blade members are vertically offset from a feed-plane a distance in the range 1.8 mm to 3 mm, measured parallel to the compression plane.

19. A laminator assembly according to claim 1, wherein at least one set of blade members is mounted to an element fixed with respect to the axis of rotation of the respective roller.

20. A laminator assembly according to claim 19, wherein the laminator assembly incorporates a roller support assembly supporting each roller for rotation with respect to the assembly, at least one set of blade members being fixedly mounted to the roller support assembly.

21. A laminator assembly according to claim 20, wherein the roller support assembly includes a first heating shoe surrounding one of the rollers, a second heating shoe surrounding the other of the rollers, and the first set of blade members being fixedly attached to the first heating shoe and the second set of blade members being fixedly attached to the second heating shoe.

22. A laminator assembly according to claim 20, wherein the individual blade members are separate from one another.

23. A laminator assembly according to claim 1, wherein the laminator assembly comprises a pair of exit guide plates on the exit side of the rollers, the guide plates incorporating one or more venting apertures.

24. A laminator assembly according to claim 1, wherein the blade members are positioned outside the compression zone.

* * * * *